US010465804B2

(12) United States Patent
Watanabe et al.

(10) Patent No.: US 10,465,804 B2
(45) Date of Patent: Nov. 5, 2019

(54) STRUCTURE AND METHOD FOR FASTENING BALL SEAT FOR BALL VALVE, TRUNNION BALL VALVE, AND HYDROGEN STATION USING THE BALL VALVE

(71) Applicant: KITZ CORPORATION, Chiba (JP)

(72) Inventors: Osamu Watanabe, Chiba (JP); Tomoya Yamasaki, Chiba (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 15/320,942

(22) PCT Filed: Jun. 24, 2015

(86) PCT No.: PCT/JP2015/068164
§ 371 (c)(1),
(2) Date: Dec. 21, 2016

(87) PCT Pub. No.: WO2016/002593
PCT Pub. Date: Jan. 7, 2016

(65) Prior Publication Data
US 2017/0130847 A1 May 11, 2017

(30) Foreign Application Priority Data
Jun. 30, 2014 (JP) .................................. 2014-134339

(51) Int. Cl.
*F16K 5/06* (2006.01)
*F17C 5/00* (2006.01)
(Continued)

(52) U.S. Cl.
CPC .......... *F16K 5/0647* (2013.01); *B23P 15/001* (2013.01); *F16K 5/06* (2013.01);
(Continued)

(58) Field of Classification Search
CPC ........ F16K 5/06; F16K 5/0663; F16K 5/0647; F16K 5/0673; F16K 5/0668; B23P 15/001;
(Continued)

(56) References Cited

U.S. PATENT DOCUMENTS 4,135,545 A * 1/1979 Fowler .................. F16K 5/0673
137/246.22
5,419,532 A * 5/1995 Fan ....................... F16K 5/0673
251/315.08
(Continued)

FOREIGN PATENT DOCUMENTS

JP     61-201897     12/1986
JP     6-25672     4/1994
(Continued)

OTHER PUBLICATIONS

International Search Report dated Oct. 6, 2015 in International Application No. PCT/JP2015/068164.

*Primary Examiner* — Marina A Tietjen
(74) *Attorney, Agent, or Firm* — Wenderoth, Lind & Ponack, L.L.P.

(57) ABSTRACT

A structure and method for fastening a ball seat for a ball valve, a trunnion ball valve, and a hydrogen station using the ball valve, in which a stepped part is positioned medially in each of inner and outer peripheral surfaces of a resin-made annular seat body, with a seat part on a tip side and a holding part on a rear end side; an attachment groove defined by inner and outer cylinders having a ring-shaped swaging edge part at a tip of a seat retainer; the holding part being attached to the attachment groove; and the swaging edge part of the inner and outer cylinders being in contact with and fixed by being swaged to the stepped part so as to cause the seat part to protrude farther than a swaging position.

8 Claims, 6 Drawing Sheets

(51) Int. Cl.
*F17C 13/04* (2006.01)
*B23P 15/00* (2006.01)

(52) U.S. Cl.
CPC .......... *F16K 5/0663* (2013.01); *F16K 5/0668* (2013.01); *F17C 5/007* (2013.01); *F17C 13/04* (2013.01)

(58) Field of Classification Search
CPC ............... F17C 13/04; Y10T 137/6041; Y10T 137/6038; Y10T 137/4442
See application file for complete search history.

(56) References Cited

U.S. PATENT DOCUMENTS

| | | | |
|---|---|---|---|
| 7,497,191 B2* | 3/2009 | Fulton | ................ G06Q 30/0225 123/3 |
| 7,721,682 B2* | 5/2010 | Fulton | ................ G06Q 30/0225 123/3 |
| 8,490,945 B2 | 7/2013 | Keeper et al. | |
| 9,444,109 B2* | 9/2016 | Wang | ................ H01M 8/04201 |
| 9,879,790 B2* | 1/2018 | Gomi | .................... F16K 5/0694 |
| 2003/0205688 A1* | 11/2003 | Milberger | ............. F16K 5/0605 251/315.01 |
| 2003/0209282 A1 | 11/2003 | Satou et al. | |
| 2005/0205826 A1* | 9/2005 | Scaramucci | .......... F16K 5/0673 251/314 |
| 2014/0216599 A1* | 8/2014 | Loewenthal | ............. F17C 5/00 141/4 |

FOREIGN PATENT DOCUMENTS

| | | |
|---|---|---|
| JP | 9-210224 | 8/1997 |
| JP | 2003-336795 | 11/2003 |
| JP | 2005-133763 | 5/2005 |
| JP | 2012-237345 | 12/2012 |
| JP | 2012-237437 | 12/2012 |
| WO | 2013/129560 | 9/2013 |

* cited by examiner

STRUCTURE AND METHOD FOR FASTENING BALL SEAT FOR BALL VALVE, TRUNNION BALL VALVE, AND HYDROGEN STATION USING THE BALL VALVE

TECHNICAL FIELD

The present invention relates to, in particular, a structure and method for fastening a ball seat for a ball valve suitable for high-pressure fluid such as hydrogen, a trunnion-type ball valve, and a hydrogen station using this valve.

BACKGROUND ART

In piping equipment or the like in which high-pressure fluid such as hydrogen flows, a trunnion-type ball valve for high pressure is used to reliably prevent leakage of the high-pressure fluid. The ball valve of this type is normally provided to a structure in which a ball valve body is supported in a rotatable body via a stem and a trunnion, a ball seat is attached inside the body as being in a state of being held by a retainer member, and this ball seat is attached in a close-contact state to the ball valve body via the retainer member and via a spring force of a spring. Here, a portion between the retainer member and the body is sealed by an O ring for sealing.

As a ball valve for high-pressure fluid as described above, a trunnion-type ball valve for high pressure of PTL 1 is disclosed. This ball valve is suitable particularly for a valve for a hydrogen station for a fuel-cell vehicle and, in view of the purpose of keeping hermeticity of a valve seat with respect to high-pressure hydrogen over a long period of time to ensure durability, is provided to a structure in which a metal-made ball seat, that is, a metal seat, is attached for sealing with a ball.

On the other hand, as another technique for improving valve seat sealability of a ball valve, a ball valve of PTL 2 is disclosed. In this ball valve, a resin-made ball seat, that is, a soft seat, is provided for sealing with a ball. In this case, the structure is such that the resin-made ball seat is fixed to a seat retainer and is pressed by a spring to a ball side.

In these ball valves for high-pressure fluid, it is required to improve hermeticity while ensuring slidability between the ball and the seat side.

These ball valves are used as a shutoff valve in a dispenser in, for example, a hydrogen station described in PTL 3. The shutoff valve is connected via a connection hose to a filling nozzle as a region of filling a vehicle with hydrogen and is provided so that, with this shutoff valve being opened and closed, hydrogen is supplied to a hydrogen tank of the vehicle via the connection hose and the filling nozzle.

CITATION LIST

Patent Literatures

PTL 1: International Publication No. 2013/129560
PTL 2: U.S. Pat. No. 8,490,945
PTL 3: Japanese Patent Application Laid-Open No. 2012-237437

Technical Problem

When so-called ultrahigh-pressure fluid of 90 MPa or higher flows with respect to a ball valve for high-pressure fluid, it is more difficult to ensure hermeticity between the ball and the seat to prevent leakage. Moreover, since it is also required to ensure slidability, it is difficult for the ball valve of the metal seat as in PTL 1 to uniformly exert complete sealing of high-pressure fluid depending on the use state such as open/close frequency, and subtle leakage of ultrahigh-pressure fluid may occur.

On the other hand, in the case of the ball valve of the soft seat as in PTL 2, the ball seat is attached so as to fit in an attachment groove of the seat retainer, and the position of the ball seat is not regulated in a pullout direction. Thus, when ultrahigh-pressure fluid of 90 MPa or higher flows and the valve is operated from close to open, if even a little amount of fluid infiltrates between the ball seat and the seat retainer, the ball seat is pushed out from the seat retainer by this fluid pressure to cause positional misalignment and detachment, possibly leading to leakage of ultrahigh-pressure fluid in the case of a valve close state. Thus, when the ball valve for high pressure is used as a shutoff valve in a hydrogen station as in PTL 3, high-pressure hydrogen may leak from a secondary side, and this high-pressure hydrogen may remain in the filling hose, thereby making it impossible to connect the filling nozzle to the hydrogen tank of the vehicle. To solve this, it is required to perform work referred to as so-called depressurization of extracting pressure from the filling hose. However, in view of effective use of hydrogen and from efficiency in filling work, depressurization is not desirable. Moreover, when the capacity of the filling hose is small, for example, on the order of approximately 200 cc, if a little amount of high-pressure hydrogen is leaked from the shutoff valve to the secondary side, hydrogen pressure tends to remain in the filling hose, and the necessity for frequently performing depressurization arises.

SUMMARY OF INVENTION

The present invention has been developed to solve the above-described problems, and its object is, in particular, to provide a structure and method for fastening a ball seat for a ball valve, a trunnion-type ball valve and a hydrogen station using this valve, the ball valve being suitable for high-pressure fluid, ensuring hermeticity and slidability by seal by a soft seat, the ball seat being held in a retainer even when ultrahigh-pressure fluid flows to prevent positional misalignment and detachment to keep high sealability when the valve is closed.

Solution to Problem

To achieve the object described above, the invention according to claim 1 is directed to a structure for fastening a ball seat for an ultrahigh-pressure ball valve, comprising: an annular seat body made of resin so that a cross-sectional structure of the annular seat body is an integral structure and a seal surface of the annular seat body in contact with a ball surface is a single ring-shaped surface; and a seat retainer including an inner cylinder having a first swaging edge part at a tip of the inner cylinder and an outer cylinder having a second swaging edge part at a tip of the outer cylinder, wherein: the seat retainer includes an attachment groove defined by the first swaging edge part and the second swaging edge part; the annular seat body comprises a first stepped part positioned medially in an inner peripheral surface of the annular seat body, a second stepped part positioned medially in an outer peripheral surface of the annular seat body, a seat part on a tip side of the annular seat body, and a holding part on a rear side of the annular seat body; the holding part is attached to the attachment groove; and the first swaging edge part is in contact with and fixed to the first stepped part by being swaged and the second swaging edge part is in contact with and fixed to the second stepped part by being swaged so as to cause the seat part to protrude farther than a swaging position.

The invention according to claim 2 is directed to the structure for fastening the ball seat for the ultrahigh-pressure ball valve, wherein: a first tapered surface tilted to a tip side is defined on the first stepped part, and the first swaging edge part is in contact with and sealed to the first tapered surface; and a second tapered surface tilted to a tip side is defined on the second stepped part, and the second swaging edge part is in contact with and sealed to the second tapered surface.

The invention according to claim 3 is directed to the structure for fastening the ball seat for the ultrahigh-pressure ball valve, wherein the seat part has a diameter-reduced form, and the holding part is thicker and longer than the seat part.

The invention according to claim 4 is directed to the structure for fastening the ball seat for the ultrahigh-pressure ball valve, wherein the annular seat body is formed of a PEEK material, and a seal surface in contact with a ball surface is formed on a tip surface of the seat part.

The invention according to claim 5 is directed to the structure for fastening the ball seat for the ultrahigh-pressure ball valve, wherein the seat retainer is formed of a nickel base alloy.

The invention according to claim 6 is directed to a method for fastening a ball seat for an ultrahigh-pressure ball valve using the structure for fastening the ball seat for the ultrahigh-pressure ball valve, comprising: moving a swaging jig in an axis center direction of the seat retainer so as to: (i) cause a tilted surface on the swaging jig to abut a tapered end face part on the seat retainer for positioning; and (ii) cause the first swaging edge part fixed to the first tapered surface or the second swaging edge part fixed to the second tapered surface along the tapered end face part to attach the ball seat to the seat retainer.

The invention according to claim 7 is directed to a trunnion ultrahigh-pressure ball valve having a trunnion structure in which a metal seat mechanism is on a primary side of the trunnion ultrahigh-pressure ball valve and a ball seat attached to the seat retainer by the structure is on a secondary side.

The invention according to claim 8 is directed to a hydrogen station using a ball valve in which the trunnion ultrahigh-pressure ball valve is configured in a hydrogen supply line.

The invention according to claim 9 is directed to a hydrogen station being a trunnion ultrahigh-pressure ball valve having: an automatic valve in a dispenser, the automatic valve being configured to open and close along with a start and an end of filling of hydrogen, a filling nozzle connected to the automatic valve via a filling hose, and a depressurizing mechanism configured to discharge hydrogen in the filling hose into air along with the end of filling of hydrogen, wherein: the automatic valve has a metal seat mechanism on a primary side to which hydrogen pressure from a hydraulic accumulator is to be always loaded and a soft seat mechanism with a resin annular seat body in contact with and fixed to the soft seat mechanism by swaging, the resin annular seat body being positioned on a secondary side to which hydrogen pressure and atmospheric pressure are to be alternately loaded along with filling and depressurization of hydrogen.

Advantageous Effects of Invention

From the invention according to claim 1, in particular, a ball valve suitable for high-pressure fluid can be provided, and hermeticity and slidability are ensured by seal by a soft seat. The holding part of the annular seat body is attached to the attachment groove of the seat retainer, the swaging edge part of the seat retainer is swaged to the stepped part to be closely contacted and fixed to cause the seat part to protrude more than a swaging position to hold and fix the ball seat. With this, for example, even if ultrahigh-pressure fluid of a 98 MPa class flows in a valve open state, it is possible to firmly hold the ball seat while preventing positional misalignment or detachment from the retainer, and high sealability in a valve close state can be reliably kept.

From the invention according to claim 2, while the swaging part is closely contacted with and sealed to the tapered surface of the stepped part, the ball seat is swaged and fixed to the seat retainer. With this, the swaging position with respect to the seat retainer is accurately set. Furthermore, by swaging the swaging edge part along the tapered surface, it is possible to accurately find out the shape and dimension of the swaged region.

From the invention according to claim 3, the seat part, which is a seal portion with the ball, is formed in a diameter-reduced form, and the holding part, which is a mount portion to the seat retainer, is formed so as to be longer than the seat part while being formed in a thick form. With this, even when high-pressure fluid flows, stiffness is ensured to prevent deformation, and high sealability is kept to reliably prevent leakage of fluid.

From the invention according to claim 4, the annular seat body is formed of a PEEK material, and the seal surface in contact with the ball surface is formed on the tip surface of the seat part. With this, while sliding friction at the time of valve operation is decreased to improve operability, sealability can also be ensured. Also, with increased slidability, durability of the ball can be improved to also suppress deterioration.

From the invention according to claim 5, with the seat retainer formed of the nickel base alloy, it has high strength even if it is thin, and is resistant to hydrogen embrittlement. Furthermore, elongation characteristics required for swaging can be exerted.

From the invention according to claim 6, while the seat retainer is positioned by using the tilted surface of the swaging jig, the swaging edge part is closely contacted with and fixed to the tapered surface along the tapered end face part to attach the ball seat to the seat retainer. With this, the ball seat can be positioned and fixed while being centered with respect to the seat retainer. After attachment, positional misalignment of the ball seat is prevented by the swaging edge part to reliably keep high sealability also with respect to ultrahigh-pressure fluid.

From the invention according to claim 7, valve seat sealability and durability are ensured by the metal seat mechanism on the primary side, and leakage is reliably prevented by the soft seat mechanism of the ball seat attached to the seat retainer on the secondary side.

From the invention according to claim 8, while hermeticity and slidability at the time of operation are ensured to address mass production, for example, even when ultrahigh-pressure fluid of a 98 MPa class flows, it is possible to firmly hold the ball seat while preventing positional misalignment or detachment from the retainer, and high sealability can be kept. Since the valve body is operated automatically or manually to supply or stop a predetermined amount of hydrogen, the predetermined amount of hydrogen can be supplied quickly with high efficiency, and work called depressurization can also be reduced.

From the invention according to claim 9, by adopting the metal seat mechanism on the primary side, seat detachment can be prevented, and valve-seat sealability with durability can be obtained. Also, by adopting the soft seat mechanism with the resin-made annular seat body closely contacted with and fixed to the secondary side by swaging, the possibility of detachment of the seat can be prevented, and valve seat sealability exerting high sealability can be obtained, and a hydrogen station with reduced unnecessary depressurization can be obtained.

DESCRIPTION OF EMBODIMENT

Figure 1:
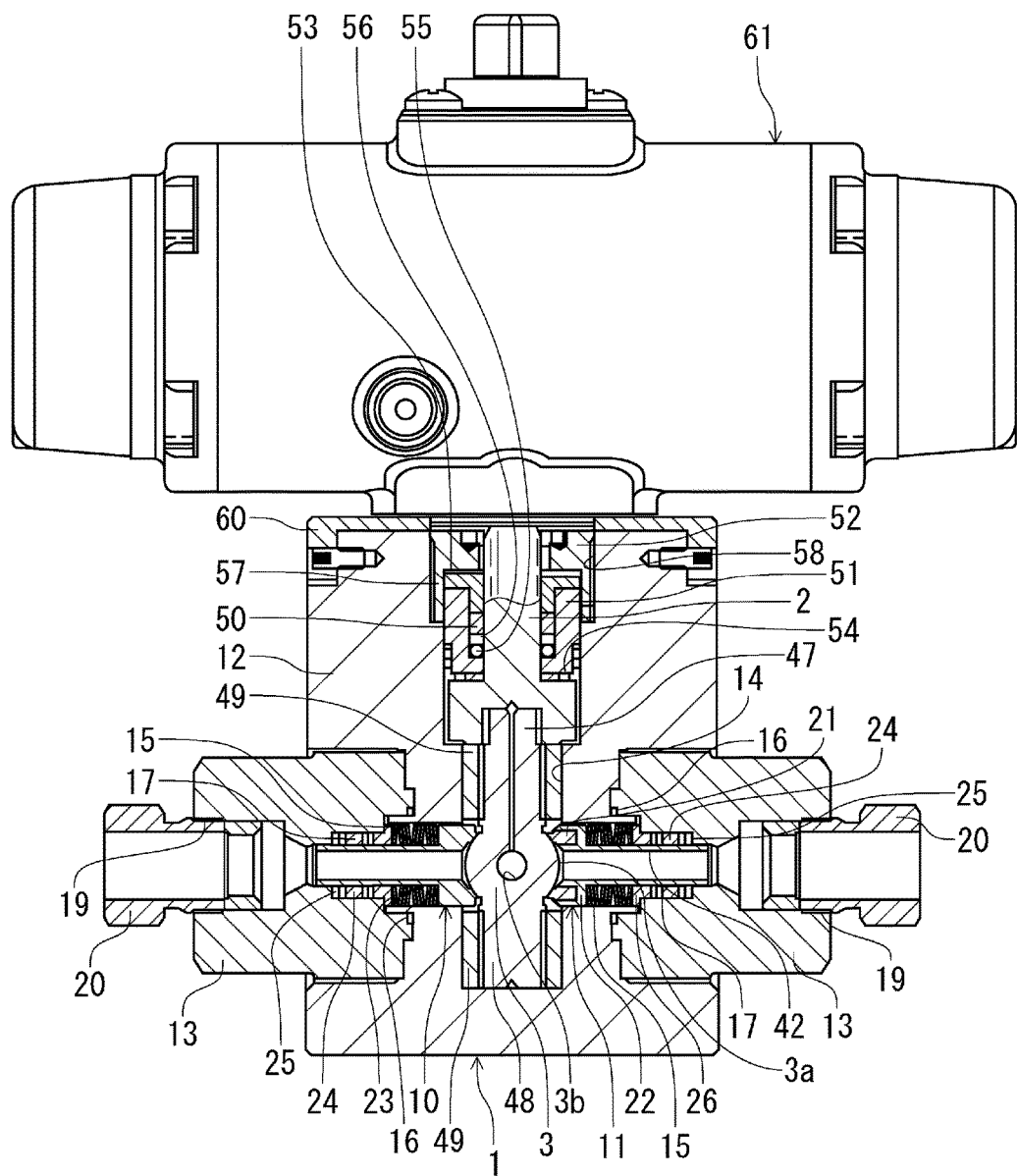
FIG. 1 is a partially cutout front view depicting a trunnion-type ball valve.
Figure 2:
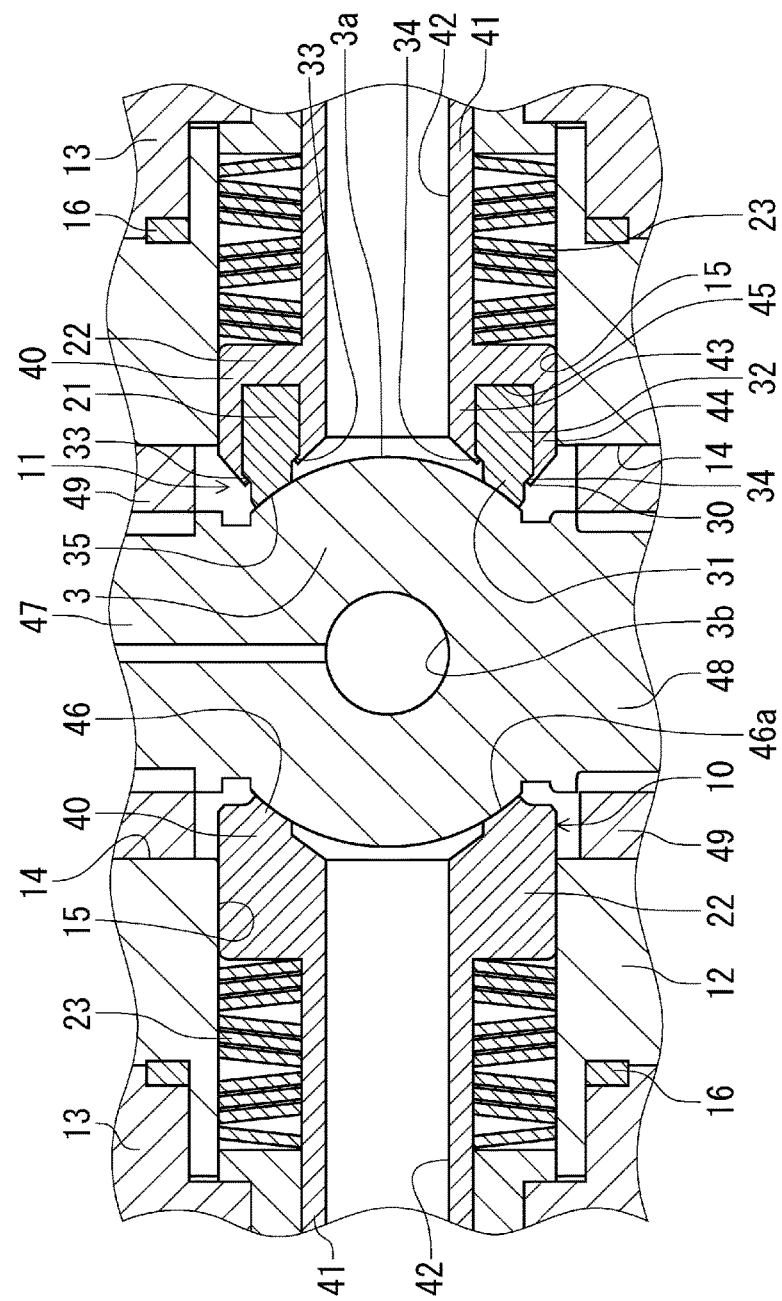
FIG. 2 is an enlarged sectional view of main parts of FIG. 1.

In the following, a case is described in detail based on the drawings in which an embodiment of a structure for fastening a ball seat for a ball valve in the present invention is applied to a trunnion-type ball valve. In FIG. 1, a trunnion-type valve for high-pressure fluid is depicted, with a ball seat fixed by the structure for fastening the ball seat for the ball valve of the present invention. In FIG. 2, an enlarged sectional view of main parts of FIG. 1 is depicted. Here, high pressure in the present embodiment is equal to or higher than 35 MPa, and 70 MPa to 105 MPa in piping equipment for a hydrogen station using a ball valve and, specifically, high-pressure fluid of 90 MPa or higher called ultrahigh-pressure fluid is assumed.

In the drawing, inside a ball valve main body (hereinafter referred to as a valve main body) 1, via a stem 2, a ball 3, which is a valve body, is rotatably provided. On both sides of this ball 3, seat mechanisms 10 and 11 are arranged so as to be in seal contact with the ball 3. The valve main body 1 is configured of a body 12, with cap members 13, 13 provided to a primary side and a secondary side, respectively, of this body 12. Inside this body 12, the seat mechanisms 10 and 11 are each provided.

The body 12 is formed in a substantially rectangular parallelepiped shape. Inside this body 12, a shaft insertion hole 14 where the ball 3, the stem 2, and so forth are attached and communication holes 15, 15 where the seat mechanism 10 and 11 can be arranged in a direction crossing this shaft insertion hole 14 are each formed. To both sides of the body 12, the cap members 13, 13 are screwed via a gasket 16.

On a body 12 side of the cap member 13, an attachment hole 17 is provided. On the other side of this attachment hole 17, a female screw part 19 is formed. To this female screw part 19, an outer joint 20 is provided connectably by screwing. The cap member 13 can be integrated with the body 12 by bonding means such as adhesion, welding, or the like.

The seat mechanisms provided inside the body 12 are provided in different seat structures between the primary side and the secondary side. The seat mechanism 10 on the primary side is formed of a metal seat mechanism, and the seat mechanism 11 on the secondary side is formed of a soft seat mechanism with a ball seat attached to a seat retainer.

The soft seat mechanism 11 on the secondary side has an annular seat body 21 forming a ball seat, a seat retainer 22, a spring member 23, a seal member 24, a backup ring 25, and a receiving member 26.

Figure 3:
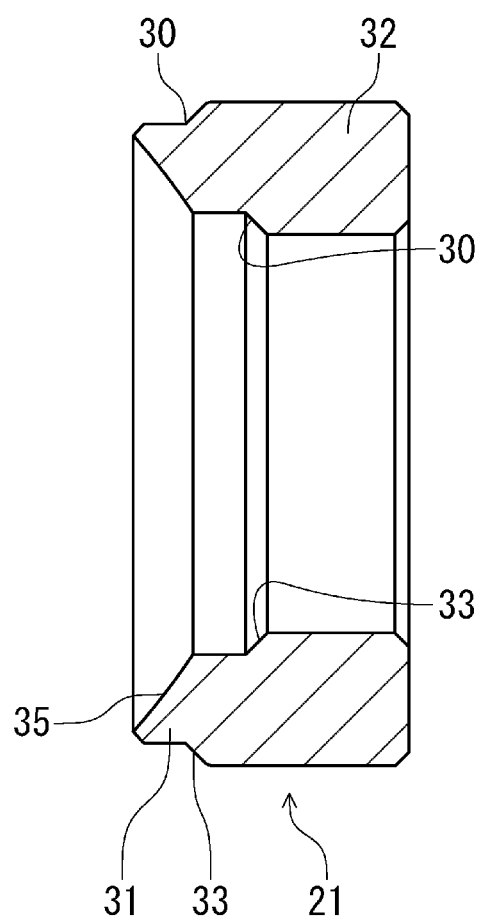
FIG. 3 is a longitudinally sectional view depicting a ball seat.

In FIG. 2 and FIG. 3, the annular seat body 21 is made of resin such as a PEEK material having more strength than that of PTFE. In mid course of each of inner and outer circumferential surfaces of this annular seat body 21, a stepped part 30 is provided. A seat part 31 is provided on a tip side (ball 3 side) of this stepped side 30, and a holding part 32 is provided on a rear end side (seat retainer 22 side). On the stepped part 30, a tapered surface 33 tilted to the tip side is formed. On this tapered surface 33, a swaging edge part 34 of the seat retainer 22, which will be described further below, is provided so as to be capable of close-contact and sealing. The tapered surface 33 in the present embodiment is provided at an angle of substantially 45° from a horizontal direction in the drawing.

The seat part 31 of the annular seat body 21 is formed in a diameter-reduced form, that is, in a slightly thin form with respect to the holding part 32. Also, the holding part 32 is formed in a thicker form than the seat part 31. Furthermore, the holding part 32 is formed longer than the seat part 31.

On a tip surface of the seat part 31, a seal surface 35 in contact with a ball surface 3a of the ball 3 is formed. This seal surface 35 is processed in a recessed arc shape substantially identical in shape to an abutting region of the ball surface 3a.

The seat retainer 22 depicted in FIG. 2 is formed of stainless steel or a nickel base alloy (including, for example, Inconel (registered trademark), although not limited thereto) as a base material, and is provided to arrange the annular seat body 21 at a predetermined position of the ball 3 for press sealing. By using the nickel base alloy, in particular, Inconel (registered trademark), it is possible to obtain a seat retainer with high strength even if it is thin, resistant to hydrogen embrittlement and, furthermore, with elongation characteristics required for swaging, which will be described further below. The seat retainer 22 has a diameter-expanded part 40 disposed on a ball 3 side and a cylinder part 41 with its diameter reduced more than this diameter-expanded part 40. On an inner side of the seat retainer 22, an inner flow channel 42 is formed.

At a tip of the diameter-expanded part 40 of the secondary-side seat retainer 22, a ring-shaped swaging edge part 34 is provided on a tip side of each of an inner cylinder 43 and an outer cylinder 44. An attachment groove 45 formed of these inner and outer cylinders 43 and 44 is formed at a forward side of the diameter-expanded part 40. The swaging edge part 34 in the present embodiment is formed to be thin to a degree of approximately 25% to 30% of the thickness of the inner and outer cylinders 43 and 44. In the attachment groove 45, the holding part 32 of the annular seat body 21 is formed so as to be attachable. In a state in which the holding part 32 is attached to the attachment groove 45, the swaging edge parts 34 of the inner and outer cylinders 43 and 44 are swaged to the stepped part 30 for close-contact and fixing. With this, the seat part 31 protrudes more than a swaging position, specifically, a tip of the swaging edge part 34.

On the other hand, in the metal seat mechanism 10 on the primary side, a ball seat portion is integrally formed with this seat retainer 22 by the same metal material, and a metal-made seat part 46 is formed at the tip of its diameter-expanded part 40. In this manner, the primary side of the ball 3 is sealed by the metal-made seat part 46. A seal surface 46a of this metal-made seat part 46 is formed in an approximately same shape as the seal surface 35 of the seat part 31 in the soft seat mechanism 11 on the secondary side.

The cylinder part 41 of the seat retainer 22 is formed with a single outer dimeter and in a straight form. On its outer perimeter, the seal member 24 and the backup ring 25 are attached. In this state, the seal member 24 and the backup ring 25 are inserted in the inner perimeter of the attachment hole 17. With this, the seat retainer 22 is provided so as to be movable in a flow channel direction with respect to the communication hole 15 and, when moved, the outer peripheral side of the cylinder part 41 is sealed by the seal member 24.

The spring member 23 is formed of a plurality of disc springs, and is attached to the seat retainer 22 in the communication hole 15 via the receiving member 26. By the spring member 23, a repulsive force in a ball 3 direction is provided to the seat retainer 22, and the annular seat body 21 is pressed to the ball 3 with a predetermined pressure to be sealed. The spring member 23 may be a spring other than disc springs, and a coil spring may be provided. The receiving member 26 is formed in a ring form, is attached to an opening side of the attachment hole 17, and is configured to receive a force from the spring member 23.

In FIG. 1, the seal member 24 is formed of a rubber-made O ring, and the backup ring 25 is formed of PTFE (polytetrafluoroethylene). Although the seal member 24 and the backup ring 25 may be formed of different materials, in this case, a soft material with the same degree as that of rubber and PTFE is preferably used for each, thereby, here, allowing attachment to the attachment hole 17 while sealability is exerted. The seal member 24 is protected, with the backup rings 25 arranged on both sides.

The ball 3 is formed with stainless steel as a base material, has a shaft part 47 on an upper part side and a trunnion (lower stem) 48 on a lower part side, and is rotatably provided, with the shaft part 47 and the lower stem 48 mounted via a bearing 49 attached to the shaft insertion hole 14. By rotating and operating the ball 3 by the stem 2 and making a communication hole 3b formed inside the ball 3 and the inner flow channel 42 of the seat retainer 22 communicate to each other, a valve open state is produced.

In the shaft insertion hole 14, a washer 51 accommodating a gasket 50, a gland 52, a bush 53, and a bearing 54 are disposed, in addition to the bearing 49. Via these, the stem 2 is rotatably attached inside the body 12.

The washer 51 is formed in a substantially cylindrical form, with the gasket 50 sealing the outer perimeter of the stem 2 attached to an inner side and with a seal O ring 55 and a protection ring 56 attached to an outer side. The washer 51 is disposed on an upper part side of the stem 2 via the bearing 54. With this, the stem 2 is rotatably provided with respect to the gasket 50 and the gland 52.

The gland 52 is formed in a substantially cylindrical form, and a lower part thereof is provided with a cylinder part 57 in which an upper part side of the washer 51 can fit. The gland 52 fits in a fitting recessed part 58 formed in an upper part of the body 12 to be mounted on the upper part of the washer 51. In this case, the bush 53 is attached from above the gasket 50 and, with this bush 53 interposed between the washer 51 and the gland 52, the gasket 50 is pressed in a lower surface direction of the washer 51 to improve sealability. With this structure, leakage of high-pressure fluid in a direction of the shaft insertion hole 14 is prevented.

On an upper surface of the body 12, a cover 60 is mounted, and an actuator 61 is incorporated in the valve main body 1 via this cover 60. An output shaft not depicted of the actuator 61 is connected to the stem 2, and the ball 3 is provided so as to be automatically operated by the actuator 61 via the stem 2.

Note that while the primary side of the ball valve is taken as the metal seat mechanism 10 in the above embodiment, a soft seat mechanism may be provided also on this primary side similarly as the secondary side.

Subsequently, operation in the above embodiment of the structure for fastening the ball seat for the ball valve of the present invention is described.

In the ball seat fastening structure of the present invention, the stepped part 30 is provided to the resin-made annular seat body 21, and the seat part 31 and the holding part 32 are each provided, the holding part 32 is attached to the attachment groove 45 provided at the tip of the seat retainer 22, the swaging edge part 34 provided to the inner and outer cylinders 43 and 44 is swaged to the stepped part 30 for close-contact and fixing, and the annular seat body 21 is fastened to the seat retainer 22 so that the seat part 31 protrudes more than this swaging position, thereby allowing the position of the annular seat body 21 to be regulated by the swaged region in a pullout direction to prevent positional misalignment and pullout. Thus, when the valve main body 1 is provided to a flow channel in which ultrahigh-pressure fluid of 90 MPa or higher flows, the ultrahigh-pressure fluid is prevented from infiltrating into a gap between the annular seat body 21 and the seat retainer 22 when the ball 3 is operated from open to close, and subtle leakage to the secondary side is reliably prevented.

When the valve is closed in FIG. 2, if fluid pressure is applied to the ball 3, the valve main body 1 exerts high sealability by a seal scheme called a double seal scheme. The double seal scheme is a scheme of exerting a seal force by a force for crushing an initial crushing margin of the seat part 31 by a spring force of the spring member 23 for close contact with the ball 3 together with the seat retainer 22 and by a so-called autofrettage force to make the ball 3 and the seat part 31 in close contact with each other by a pressing force by fluid, and has a characteristic of enhancing sealability by using the pressure by high-pressure fluid. On that occasion, the autofrettage force can be increased by adjusting the width dimension of the seat part 31 in a diameter direction.

Here, an outer diameter side of the annular seat body 21 makes close contact with the seat retainer 22 to prevent the fluid from infiltrating into this outer diameter region from a cavity side inside the valve main body 1, and the annular seat body 21 can be prevented from popping up by the pressure from this cavity side. On the other hand, with an inner diameter side of the annular seat body 21 making close contact with the seat retainer 22, the fluid is prevented from infiltrating into this inner diameter region from a flow channel side, and the annular seat body 21 can be prevented from popping up by the pressure from this flow channel side.

Furthermore, with the seat part 31 protruding to the flow channel side more than the swaging position, the swaging edge part 34 does not make contact with the ball 3 when this seat part 31 and the ball 3 are sealed, and the swaging portion does not influence sealability of the seat part 31 and the ball 3. In this case, the seat part 31 is formed in a diameter-reduced form, and the holding part 32 is formed so as to be thicker than this seat part 31. Also, the holding part 32 is formed so as to be longer than the seat part 31. With this, stiffness on a holding part 32 side is improved and, also with respect to high-pressure fluid, a tilt of the seat part 31 and so forth are prevented to exert stable sealing performance, and operation durability performance can be improved.

In the flow channel direction, with the swaging edge part 34 on an inner diameter side being away from the ball 3 more than the swaging edge part 34 on an outer diameter side, there is no possibility for the swaging edge part 34 on the inner diameter side to make contact with the ball surface 3a, and the swaged region does not influence seal performance of the seat part 31.

From these, when the above-described ball valve is used for a hydrogen station in which high-pressure hydrogen flows, leakage from the secondary side is prevented to prevent hydrogen from remaining in the flow channel for hydrogen filling, and connection of a nozzle region for hydrogen filling to a hydrogen tank of a vehicle is easily made. Since depressurization in the flow channel can be minimized to suppress discharge of hydrogen, a hydrogen station excellent in cost reduction and also in view of ecology can be provided.

Next, a method for fastening the ball seat for the ball valve is described.

Figure 4:
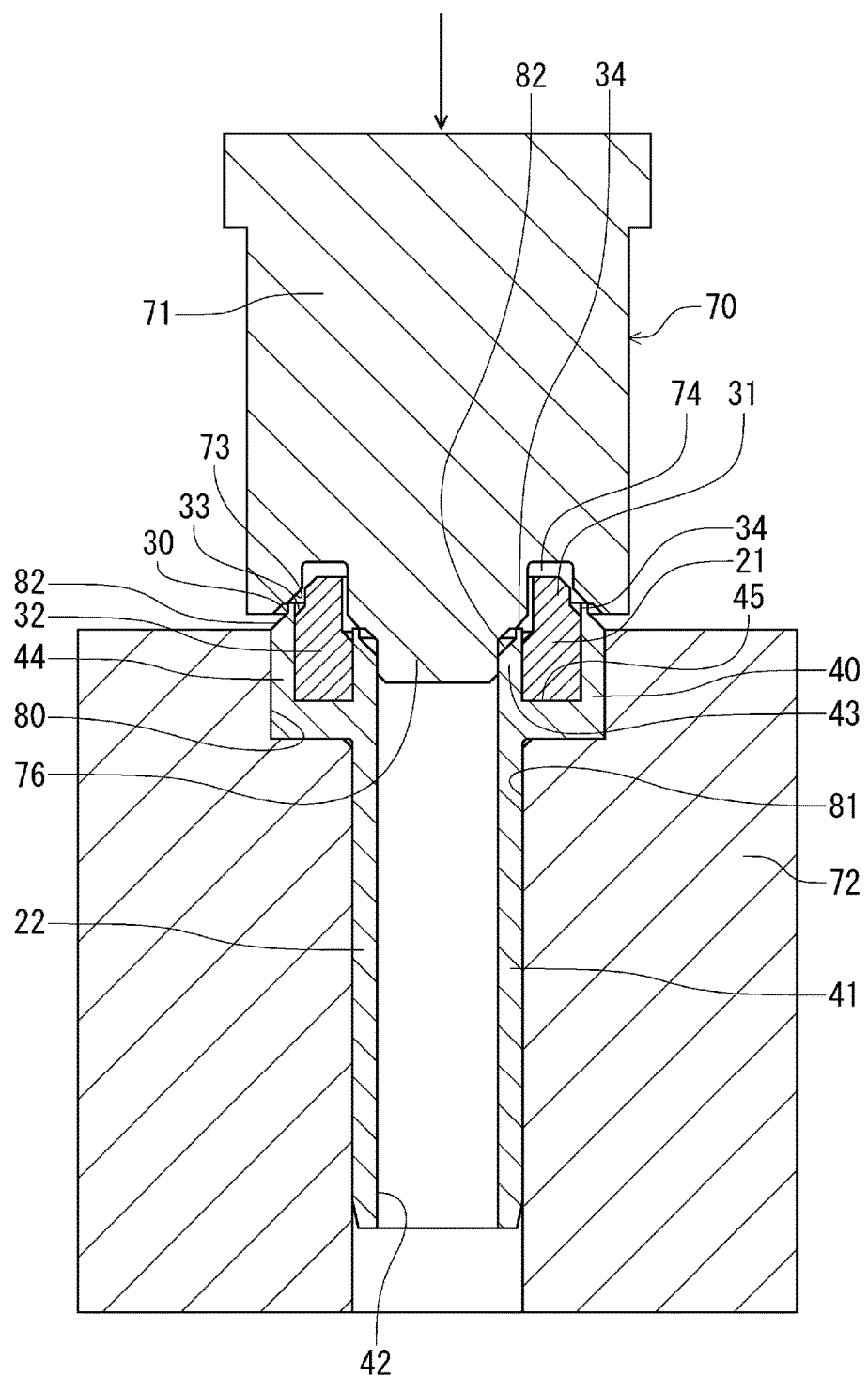
FIG. 4 is a sectional view depicting a state before swaging and fastening of the ball seat.
Figure 5:
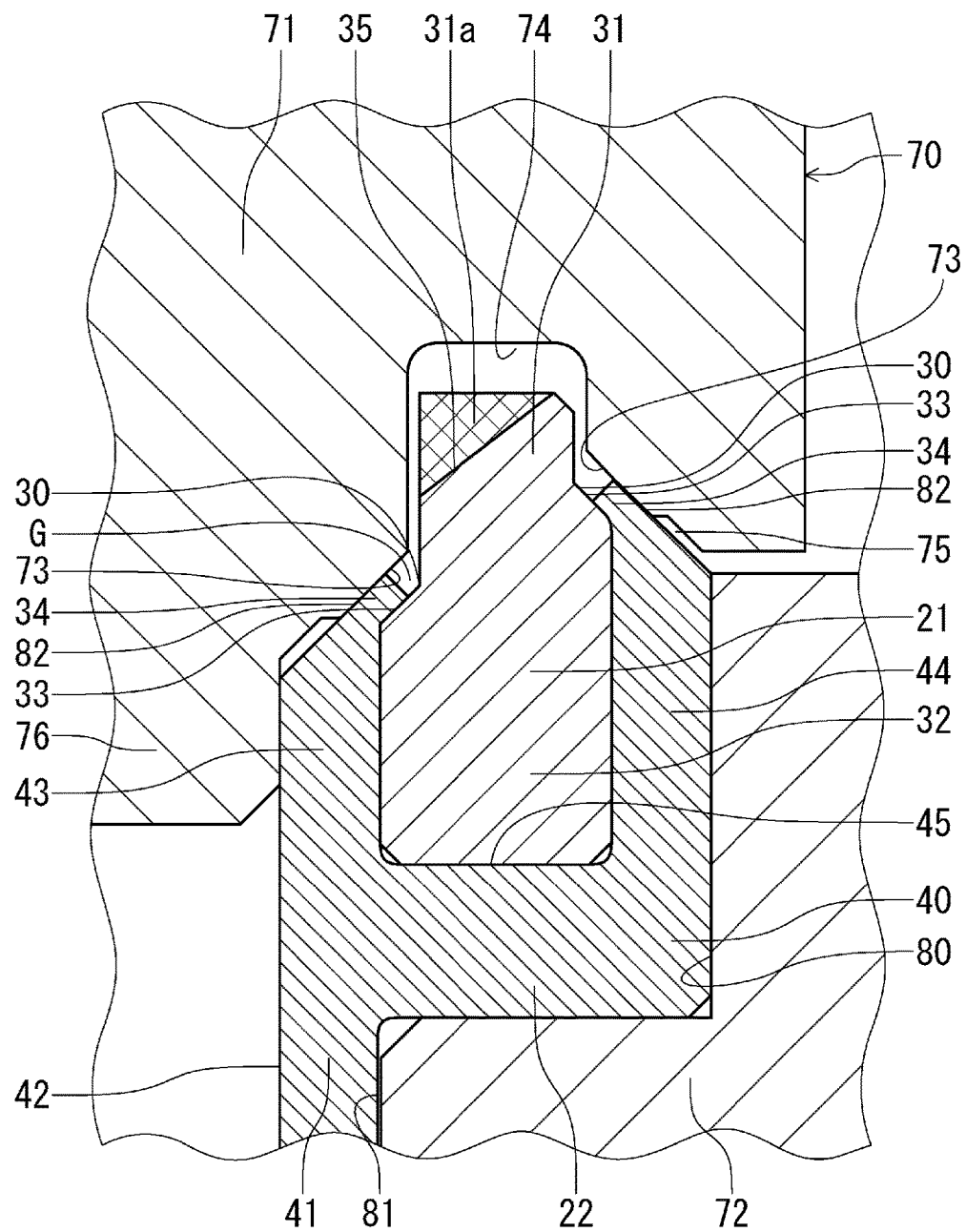
FIG. 5 is a sectional view depicting a state after swaging and fastening of the ball seat.

The above-described annular seat body 21 is fastened to the seat retainer 22 by a swaging jig 70 depicted in FIG. 4 and FIG. 5. The swaging jig 70 has an upper-mold jig 71 and a lower-mold jig 72, and the seat retainer 22 and the annular seat body 21 are attached therebetween for swaging.

On a bottom surface side of the upper-mold jig 71, a tilted surface 73 for swaging each swaging edge part 34 on the outer and inner periphery of the seat retainer 22 is provided at each of inner and outer peripheral position. Between these tilted surfaces 73, 73, a space part 74 for avoiding a contact near the seat part 31 of the annular seat body 21 provisionally attached to the seat retainer 22 is annularly formed. Each tilted surface 73 is provided at an angle of substantially 45° from a perpendicular direction in the drawing. On each of an inner peripheral side of the inner-peripheral-side tilted surface 73 and an outer peripheral side of the outer-peripheral side tilted surface 73, a recess part 75 is formed in a cutout manner. In FIG. 4, a columnar projecting part 76 is formed at a center part of the bottom surface of the upper-mold jig 71, and this columnar projecting part 76 is provided to have an outer diameter so as to fit in the inner flow channel 42 of the seat retainer 22.

On the other hand, on an upper surface side of the lower-mold jig 72, an attachment recessed part 80 is formed in which the diameter-expanded part 40 of the seat retainer 22 can fit. Continuously to this attachment recessed part 80, a fit-in hole part 81 is formed in which the cylinder part 41 can fit. To these attachment recessed part 80 and fit-in hole part 81, the seat retainer 22 to which the annular seat body 21 is provisionally attached is attached in a positioning state and, with the upper-mold jig 71 descending from the above, swaging is performed.

In FIG. 4, when swaging is performed, first, the seat retainer 22 with the annular seat body 21 provisionally attached to the attachment groove 45 is attached to the lower-mold jig 72. Here, with the diameter-expanded part 40 fitting in the attachment recessed part 80 of the lower-mold jig 72 and with the cylinder part 41 fitting in the fit-in hole part 81, the seat retainer 22 can be attached to the lower-mold jig 72 as being positioned in a centered state.

Subsequently, the upper-mold jig 71 is moved to descend with respect to the seat retainer 22 attached to the lower-mold jig 72, and the tilted surface 73 of this upper-mold jig 71 is positioned by being caused to abut on a tapered end face part 82 formed at an angle of substantially 45° continuously to the swaging edge part 34 of the seat retainer 22. With this positioning, positional misalignment of the upper-mold jig 71 with respect to the lower-mold jig 72 is prevented via the seat retainer 22.

By causing the upper-mold jig 71 to descend, the swaging edge part 34 is swaged along the tapered end face part 82 to be fixed to and in close contact with the tapered surface 33, and the annular seat body 21 is integrally fastened to the seat retainer 22. Only by causing the upper-mold jig 71 to descend so that its tilted surface 73 abuts on the tapered end face part 82 of the seat retainer 22, accuracy in swaging can be enhanced, for example, the swaging edge part 34 of the seat retainer 22 can be extendedly provided at a substantially same angle as that of the tapered end face part 82.

Also, only by being tilted, the swaging edge part 34 can be fixed to and in close contact with the tapered surface 33 of the stepped part 30. Therefore, not only swaging is facilitated, but also an area to which plastic deformation is applied by swaging near the swaging edge part 34 can be minimized.

Furthermore, with the tilted surface 73 of the upper-mold jig 71 abutting on the tapered end face part 82 of the seat retainer 22, descent of the upper-mold jig 71 can be regulated, and the swaging edge part 34 can be prevented from being excessively pressed.

Also, the tapered end face part 82 of the seat retainer 22 is formed so as to have its angle substantially equal to the angle of the swaging edge part 34. With this, compared with the case in which it is formed at a shallow angle (for example, 30°) for preventing a contact with the upper-mold jig 71, the strength at the tip of the retainer can be ensured, the strength of the swaging edge part 34 required for close-contact and fixing with the stepped part 30 of the annular seat body 21 can be kept, and it is possible to prevent the ball seat from being misaligned or detached due to deformation of the swaging edge part 34 even with high-pressure fluid of 90 MPa or higher.

Furthermore, the swaging edge part 34 swaged at a substantially same angle as that of the tapered end face part 82 of the seat retainer 22 and the tapered surface 33 of the stepped part 30 of the annular seat body 21 have a substantially same angle, that is, are parallel to each other. Thus, there is a merit of preventing an occurrence of a gap between the swaging edge part 34 and the tapered surface 33.

After this swaging, the seat retainer 22 having the annular seat body 21 swaged and fixed thereto is removed from the swaging jig 70, a removal portion 31a indicated by cross hatching at a tip side of the seat part 31 depicted in FIG. 5 is removed by curved surface finishing, and the seal surface 35 is formed at a tip surface of the seat part 31.

Note that with swaging being made so that the swaging edge part 34 makes surface contact with the tapered surface 33 of the stepped part 30 of the annular seat part 21, even if variations in dimension are present at the time of swaging, this dimensional error can be absorbed, and the swaging edge part 34 can be in close contact with and fixed to the stepped part 30.

Furthermore, when the swaging edge part 34 is swaged to the stepped part 30 of the annular seat body 21, by using wedge operation by the tapered surface 33 of the stepped part 30 or by the swaging edge part 34 tilted and extendedly provided at a substantially same angle as that of the tapered end face part 82, when the swaging edge part 34 swages the stepped part 30 in a manner that tends to press in a slightly axial direction, that is, a downward direction of FIG. 5, the dimensional error at the time of swaging can be further absorbed, and close-contact sealability of this component can be enhanced.

Furthermore, with the recess part 75 being formed in the upper-mold jig 71, a gap is provided by this recess part 75 when the tilted surface 73 of the upper-mold jig 71 is caused to abut on the tapered end face part 82. With this gap, a swaging force is prevented from being transmitted from the tilted surface 73 to the entire swaging edge part 34, excessive deformation of the swaging edge part 34 is prevented, and a close contact with the tapered surface 33 can be achieved in a state of less distortion.

Furthermore, after deformation of the swaging edge part 34, a gap G is formed between the tip side of this swaging edge part 34 and the seat part 31. With this gap G, while the dimensional error of the swaging edge part 34 is tolerated, the tip of the swaging edge part 34 is prevented from making contact with the seat part 31, and the gap between the swaging edge part 34 and the tapered surface 33 is closed to reliably prevent the fluid from infiltrating from this portion.

When the seal surface 35 of the seat part 31 after swaging is processed, with the seat part 31 protruding more than the stepped part 30, this seal surface 35 can be processed after swaging. Therefore, the seal surface 35 does not receive an influence by swaging, and can be prevented from being damaged.

Next, a hydrogen station using the above-described trunnion-type ball valve is described.

Figure 6:
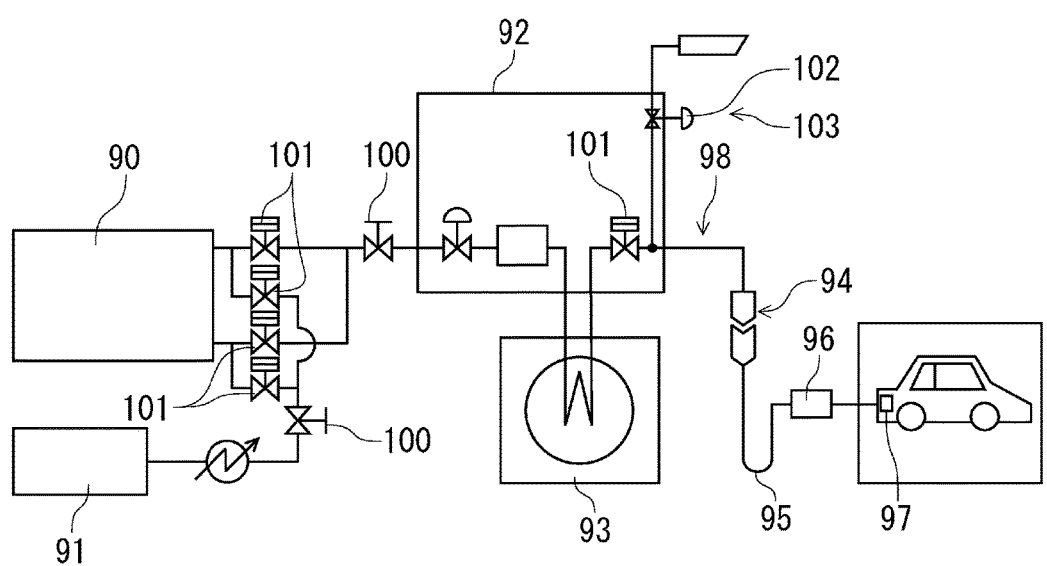
FIG. 6 is a block diagram depicting a hydrogen station.

In FIG. 6, a schematic view of a hydrogen station is depicted. The above-described trunnion-type ball valve for high pressure is provided to a line as depicted for supplying hydrogen. The hydrogen station has a hydraulic accumulator 90, a compressor 91, a dispenser 92, a precool heat exchanger 93, a quick joint 94, a filling hose 95, a filling nozzle 96, and a vehicle-mount tank 97, and these are provided to a high-pressure hydrogen supply line 98.

Since the above-described trunnion-type ball valve has small pressure loss, with the trunnion-type ball valve provided to the secondary side of the hydraulic accumulator 90, the entire pressure loss is decreased, and therefore the trunnion-type ball valve is suitable for a system of this type. As depicted in FIG. 6, as a trunnion-type ball valve, a manual valve 100 is provided to a connection region of each unit of the hydrogen station, and an automatic valve 101 is provided on a primary side or a secondary side of each unit. With these manual valves 100 and automatic valves 101, opening and closing of a flow channel is controlled.

The inside of the hydraulic accumulator 90 is divided into a plurality of tanks, and the valve 100 connecting each tank and the compressor 91 and the valve 100 connecting each tank and the dispenser 92 are provided. By switching these valves 100, hydrogen is supplied from a tank having reached a predetermined pressure to the dispenser 92. On the other hand, a tank below a predetermined lower-limit value pressure is filled with hydrogen from the compressor 91 until reaching the predetermined pressure.

The automatic valve 101 arranged inside the dispenser 92 is provided so as to be opened and closed in accordance with start and end of filling of gaseous hydrogen. The filling nozzle 96 is connected to the automatic valve 101 via the filling hose 95. The dispenser 92 is provided with a depressurizing mechanism 103 having a shutoff valve 102. This depressurizing mechanism 103 has a function of discharging, with the shutoff valve 102 being opened along with the end of filling of hydrogen, hydrogen in the filling hose 95 to the air or a hydrogen collection line substantially equivalent to atmospheric pressure. The automatic valve 101 is a trunnion-type ball valve, with the metal seat mechanism 10 disposed on the primary side to which hydrogen pressure from the hydraulic accumulator 90 or the like is always loaded and the soft seat mechanism 11 with the resin-made annular seat body 21 closely contacted therewith and fixed thereto by swaging disposed on the secondary side to which hydrogen pressure and atmospheric pressure are alternately loaded along with filling and depressurization of hydrogen.

In this hydrogen station supply line 98, hydrogen supply is controlled by a predetermined program, and an appropriate amount of hydrogen is supplied in accordance with a supply amount to a vehicle.

INDUSTRIAL APPLICABILITY

The present invention is suitable for, in particular, piping equipment in which hydrogen or the like of high-pressure fluid for use in a fuel cell flows. At least for a conduit in which high-pressure fluid flows, the present invention can exert excellent sealability and torque performance, and is suitable, for example, for a ball valve for high pressure for use in locations where various high-pressure fluids flow, such as a valve in a CNG (Compressed Natural Gas: liquefied natural gas) station and a valve for pipeline.

DESCRIPTION OF REFERENCE NUMERALS

1 valve main body
3 ball
3a ball surface
10 metal seat mechanism
11 soft seat mechanism
21 annular seat body
22 seat retainer
30 stepped part
31 seat part
32 holding part
33 tapered surface
34 swaging edge part
35 seal surface
43 inner cylinder
44 outer cylinder
45 attachment groove
70 swaging jig
73 tilted surface
82 tapered end face part
98 supply line

The invention claimed is:
1. A structure for fastening a ball seat for an ultrahigh-pressure ball valve, the structure comprising:
an annular seat body made of resin; and
a seat retainer including an inner cylinder having a first swaging edge part at a tip of the inner cylinder and an outer cylinder having a second swaging edge part at a tip of the outer cylinder,
wherein:
the seat retainer includes an attachment groove defined by the first swaging edge part and the second swaging edge part;
the annular seat body comprises: (i) a first stepped part positioned medially in an inner peripheral surface of the annular seat body, (ii) a second stepped part positioned medially in an outer peripheral surface of the annular seat body, (iii) a seat part which is on a tip side with respect to the first stepped part and the second stepped part, and (iv) a holding part which is on a rear side with respect to the first stepped part and the second stepped part;

a cross-sectional structure of the seat part is an integral structure;

a seal surface of the annular seat body in surface contact with a ball surface of a ball is on a tip surface of the seat part;

the holding part is thicker and longer than the seat part;

the holding part is attached to the attachment groove; and a first tapered surface tilted to the tip side is defined on the first stepped part, the first swaging edge part is in contact with and sealed to the first tapered surface, a second tapered surface tilted to the tip side is defined on the second stepped part, and the second swaging edge part is in contact with and sealed to the second tapered surface such that the seat part protrudes farther than the first stepped part and the second stepped part.

2. The structure according to claim 1, wherein the annular seat body is formed of a PEEK material.

3. The structure according to claim 1, wherein the seat retainer is formed of a nickel base alloy.

4. A method for fastening a ball seat for an ultrahigh-pressure ball valve using the structure according to claim 1, comprising:

moving a swaging jig in an axis center direction of the seat retainer so as to:

(i) cause a tilted surface on the swaging jig to abut a tapered end face part on the seat retainer for positioning; and (ii) cause the first swaging edge part in contact with and sealed to the first tapered surface or the second swaging edge part in contact with and sealed to the second tapered surface along the tapered end face part to attach the ball seat to the seat retainer.

5. A trunnion ultrahigh-pressure ball valve having a trunnion structure in which a metal seat mechanism is on a primary side of the trunnion ultrahigh-pressure ball valve and a ball seat attached to the seat retainer by the structure according to claim 1 is on a secondary side of the trunnion ultrahigh-pressure ball valve.

6. A hydrogen station using a ball valve in which the trunnion ultrahigh-pressure ball valve according to claim 5 is configured in a hydrogen supply line.

7. The structure according to claim 1, the seal surface is continuous from an inner side of the annular seat body to an outer side of the annular seat body.

8. A hydrogen station being a trunnion ultrahigh-pressure ball valve having:

an automatic valve in a dispenser, the automatic valve being configured to open and close along with a start and an end of filling of hydrogen, a filling nozzle connected to the automatic valve via a filling hose, and a depressurizing mechanism configured to discharge hydrogen in the filling hose into air along with the end of filling of hydrogen, wherein:

the automatic valve has a metal seat mechanism on a primary side to which hydrogen pressure from a hydraulic accumulator is to be always loaded and a soft seat mechanism with a resin annular seat body in contact with and fixed to the soft seat mechanism by swaging, the resin annular seat body being positioned on a secondary side to which hydrogen pressure and atmospheric pressure are to be alternately loaded along with filling and depressurization of hydrogen.

\* \* \* \* \*